US012677723B2

(12) United States Patent
Fay, II

(10) Patent No.: US 12,677,723 B2
(45) Date of Patent: Jul. 14, 2026

(54) CONCURRENT FIELD AND TRANSPORT CYLINDER ACTUATION FOR MOWING DEVICE TRANSPORT

(71) Applicant: CNH Industrial America LLC, New Holland, PA (US)

(72) Inventor: Jeffrey Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 455 days.

(21) Appl. No.: 18/217,076

(22) Filed: Jun. 30, 2023

(65) Prior Publication Data

US 2025/0000007 A1     Jan. 2, 2025

(51) Int. Cl.
| | |
|---|---|
| *A01B 73/00* | (2006.01) |
| *A01B 73/06* | (2006.01) |
| *A01D 34/00* | (2006.01) |
| *A01D 34/03* | (2006.01) |
| *A01D 75/00* | (2006.01) |
| *A01D 34/66* | (2006.01) |
| *A01D 101/00* | (2006.01) |

(52) U.S. Cl.
CPC ............ *A01B 73/06* (2013.01); *A01D 34/006* (2013.01); *A01D 34/66* (2013.01); *A01D 2101/00* (2013.01)

(58) Field of Classification Search
CPC .... A01B 73/06; A01B 73/005; A01D 34/006; A01D 34/66; A01D 75/002; A01D 75/004
See application file for complete search history.

(56) References Cited

U.S. PATENT DOCUMENTS

| | | |
|---|---|---|
| 4,534,416 A | 8/1985 | Johnson |
| 4,991,383 A | 2/1991 | Ermarcora |
| 5,024,279 A | 6/1991 | Warner et al. |
| 5,136,828 A | 8/1992 | Ermacora |
| 8,112,977 B2 | 2/2012 | Priepke |
| 9,545,049 B2 | 1/2017 | Barnett et al. |
| 9,603,306 B2 * | 3/2017 | Fay, II ................. A01B 73/005 |
| 2013/0284467 A1 * | 10/2013 | Snider .................. A01D 34/664 |
| | | 172/328 |
| 2021/0298214 A1 * | 9/2021 | Fay, II ................. A01D 67/005 |

FOREIGN PATENT DOCUMENTS

| | | |
|---|---|---|
| CA | 1188899 A | 6/1985 |

* cited by examiner

*Primary Examiner* — Joseph M Rocca
*Assistant Examiner* — Robert E Pezzuto
(74) *Attorney, Agent, or Firm* — CM Law PLLC; Stephen J. Weed

(57) ABSTRACT

A mower that is towed behind an agricultural vehicle. The mower has an integrated lateral transport mechanism that initiates deployment by concurrently activating both a transport actuator to move a transport frame and a transport swing actuator to rotate the trail frame.

18 Claims, 6 Drawing Sheets

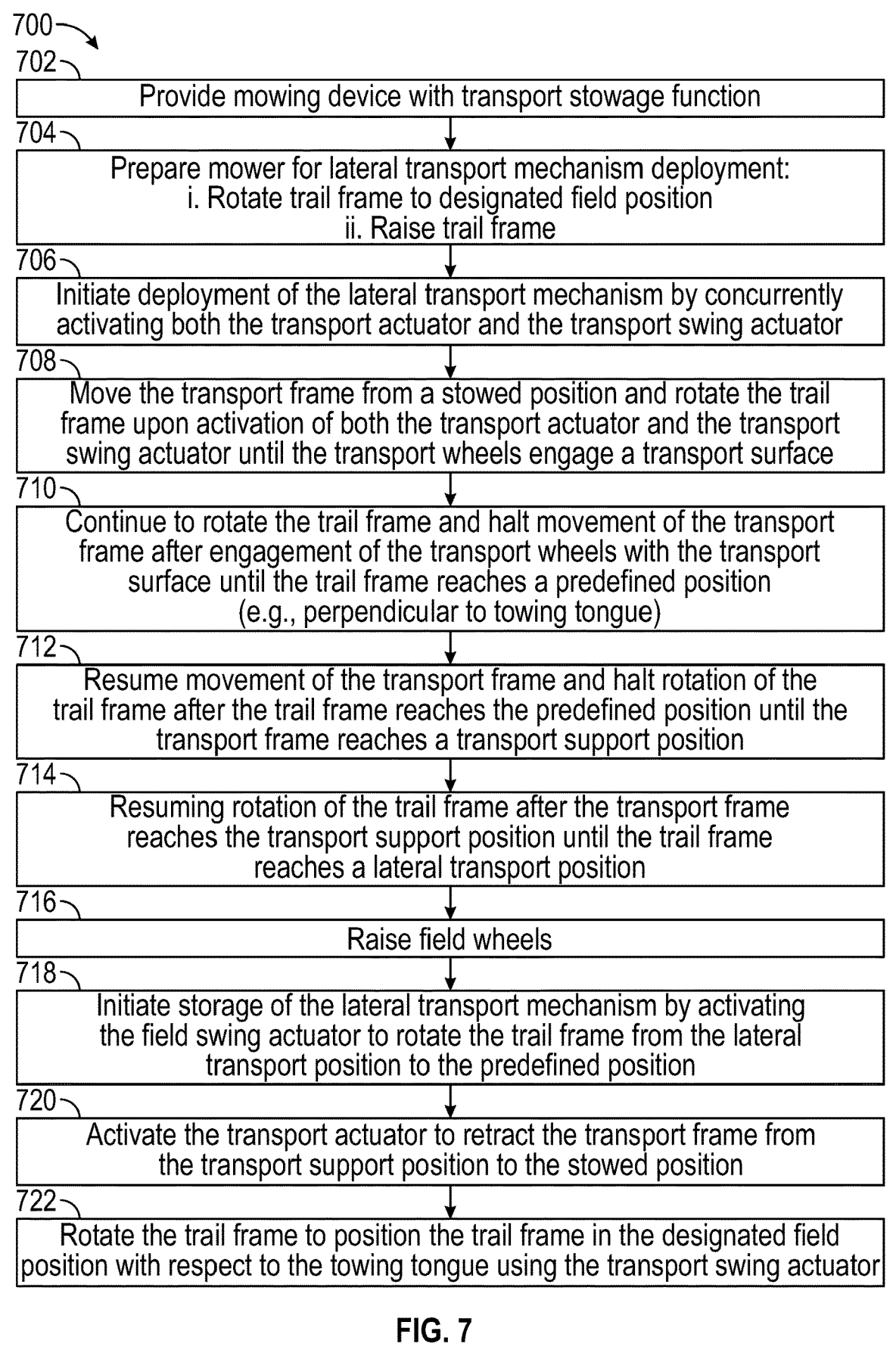

700

702

Provide mowing device with transport stowage function

704

Prepare mower for lateral transport mechanism deployment:
i. Rotate trail frame to designated field position
ii. Raise trail frame

706

Initiate deployment of the lateral transport mechanism by concurrently activating both the transport actuator and the transport swing actuator

708

Move the transport frame from a stowed position and rotate the trail frame upon activation of both the transport actuator and the transport swing actuator until the transport wheels engage a transport surface

710

Continue to rotate the trail frame and halt movement of the transport frame after engagement of the transport wheels with the transport surface until the trail frame reaches a predefined position (e.g., perpendicular to towing tongue)

712

Resume movement of the transport frame and halt rotation of the trail frame after the trail frame reaches the predefined position until the transport frame reaches a transport support position

714

Resuming rotation of the trail frame after the transport frame reaches the transport support position until the trail frame reaches a lateral transport position

716

Raise field wheels

718

Initiate storage of the lateral transport mechanism by activating the field swing actuator to rotate the trail frame from the lateral transport position to the predefined position

720

Activate the transport actuator to retract the transport frame from the transport support position to the stowed position

722

Rotate the trail frame to position the trail frame in the designated field position with respect to the towing tongue using the transport swing actuator

FIG. 7

CONCURRENT FIELD AND TRANSPORT CYLINDER ACTUATION FOR MOWING DEVICE TRANSPORT

BACKGROUND OF THE INVENTION

The present invention pertains to an agricultural mowing device and, more specifically, to a transport system for the agricultural mowing device.

A farmer may use an agricultural mowing device, such as a mower or mower conditioner, to cut crop material like hay or grass and deposit the cut crop material onto the field in windrows or swaths. Typically, the mowing device is towed behind an agricultural vehicle, such as a tractor. For cutting large fields, many mowing assemblies include a driving vehicle that pushes a mowing device conditioner in front of the vehicle while simultaneously pulling another mowing device conditioner behind the vehicle.

A mowing device generally includes a towing tongue connectable to the tractor, a subframe, i.e., trail frame, a cutting device, and a transport system. A mowing device conditioner additionally includes conditioning rollers for conditioning the cut crop material. The mowing device can be variously configured as a disc, sickle, or drum mowing device wherein the cutting device includes a series of rotatable discs, a sickle bar, or a rotating drum, respectively. In a disc-type mowing device, such as a Discbine®, the disc cutter bar may generally include multiple juxtaposed cutterheads for cutting the standing crop. Each cutterhead may consist of a rotating disc with diametrically opposed cutting blades or knives affixed to the body of the disc.

The transport system of a pull-behind mowing device is used to reduce the overall profile of the mowing device for transportation thereof. Generally, due to practical or regulatory limits, the width of the mowing device in its operating orientation prevents the towed transportation of the mowing device on farm lanes, roadways, or through gates. To reduce the width of the mowing device, the transport system may include a separate transport trailer or an integrated transport subframe with transport wheels that selectively support the mowing device.

The separate transport trailer may reorient the mowing device and carry the mowing device with its width extending along the longitudinal length of the transport trailer. In this regard, the mowing device is arranged parallel to the forward direction of travel of the towing vehicle. Such transport trailers may be useful; however, these transport trailers may add significant cost to the overall mowing operation. For instance, such transport trailers must be separately purchased, maintained, and transported between the various fields and farm headquarters, which increases the operating cost of a mowing operation.

Integrated transport systems typically include a pivotable subframe with wheels for selectively supporting the mowing device and multiple actuators for pivoting the mowing device to be parallel with the forward direction of travel of the towing vehicle. The time required for deployment of these integrated system may introduce unwanted delays.

What is needed in the art is a cost-effective and efficient integrated lateral transport system for a mowing device.

BRIEF SUMMARY OF THE INVENTION

In some aspects, the techniques described herein relate to a method for actuating a lateral transport mechanism of a mowing device including a towing tongue and a trail frame rotatably coupled to the towing tongue, the lateral transport mechanism including a transport frame supporting transport wheels, a transport actuator coupled between the towing tongue and the transport frame, and a transport swing actuator coupled between the trail frame and the towing tongue, the method including: initiating deployment of the lateral transport mechanism by concurrently activating both the transport actuator to move the transport frame supporting the transport wheels and the transport swing actuator to rotate the trail frame; moving the transport frame from a stowed position and rotating the trail frame upon activation of both the transport actuator and the transport swing actuator until the transport wheels engage a transport surface (e.g., ground, road); continuing to rotate the trail frame and halting movement of the transport frame after engagement of the transport wheels with the transport surface until the trail frame reaches a predefined position (e.g., perpendicular to towing tongue); resuming movement of the transport frame and halting rotation of the trail frame after the trail frame reaches the predefined position until the transport frame reaches a transport support position; and resuming rotation of the trail frame after the transport frame reaches the transport support position until the trail frame reaches a lateral transport position.

In some aspects, the techniques described herein relate to a mowing device including: a towing tongue; a trail frame rotatably coupled to the towing tongue, a lateral transport mechanism including a transport frame supporting transport wheels, a transport actuator coupled between the towing tongue and the transport frame, and a transport swing actuator coupled between the trail frame and the towing tongue, the lateral transport mechanism configured to: initiate deployment of the lateral transport mechanism by concurrently activating both the transport actuator to move the transport frame supporting the transport wheels and the transport swing actuator to rotate the trail frame; move the transport frame from a stowed position and rotate the trail frame upon activation of both the transport actuator and the transport swing actuator until the transport wheels engage a transport surface (e.g., ground, road); continue to rotate the trail frame and halt movement of the transport frame after engagement of the transport wheels with the transport surface until the trail frame reaches a predefined position (e.g., perpendicular to towing tongue); resume movement of the transport frame and halt rotation of the trail frame after the trail frame reaches the predefined position until the transport frame reaches a transport support position; and resume rotation of the trail frame after the transport frame reaches the transport support position until the trail frame reaches a lateral transport position.

In some aspects, the techniques described herein relate to a mowing device assembly including an agricultural vehicle and a mowing device including a towing tongue coupled to the agricultural vehicle, a trail frame rotatably coupled to the towing tongue, a lateral transport mechanism including a transport frame supporting transport wheels, a transport actuator coupled between the towing tongue and the transport frame, and a transport swing actuator coupled between the trail frame and the towing tongue, the lateral transport mechanism configured to: initiate deployment of the lateral transport mechanism by concurrently activating both the transport actuator to move the transport frame supporting the transport wheels and the transport swing actuator to rotate the trail frame; move the transport frame from a stowed position and rotate the trail frame upon activation of both the transport actuator and the transport swing actuator until the transport wheels engage a transport surface (e.g., ground, road); continue to rotate the trail frame and halt movement of the transport frame after engagement of the transport wheels with the transport surface until the trail frame reaches a predefined position (e.g., perpendicular to towing tongue); resume movement of the transport frame and halt rotation of the trail frame after the trail frame reaches the predefined position until the transport frame reaches a transport support position; and resume rotation of the trail frame after the transport frame reaches the transport support position until the trail frame reaches a lateral transport position.

BRIEF DESCRIPTION OF THE SEVERAL VIEWS OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 7 illustrates a flow chart of an example method for operating the agricultural mowing assembly.

DETAILED DESCRIPTION OF THE INVENTION

Figure 1:
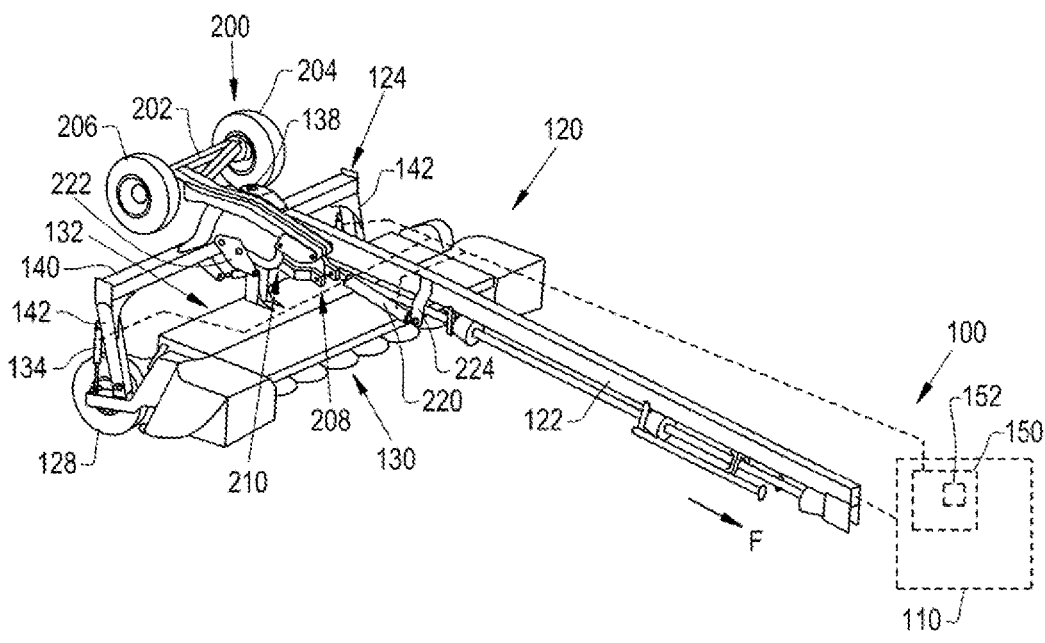
FIG. 1 is a perspective view of an exemplary embodiment of an agricultural mowing assembly, the agricultural mowing assembly including an agricultural vehicle and a towed agricultural mowing device, the agricultural mowing device includes a towing tongue and a transport system connected to the towing tongue, and the agricultural mowing device is shown to be in an intermediate field position, in accordance with an exemplary embodiment of the present invention.

The terms "forward", "rearward", "left" and "right", when used in connection with the agricultural mowing device and/or components thereof are usually determined with reference to the direction of forward operative travel of the towing vehicle, but they should not be construed as limiting. The terms "longitudinal" and "transverse" are determined with reference to the fore-and-aft direction.

Referring now to the drawings, and more particularly to FIGS. 1-5, there is shown an agricultural mowing assembly 100 that includes an agricultural vehicle 110 and an agricultural mowing device 120, which is towed by the agricultural vehicle 110 in a forward direction of travel F. The agricultural vehicle 110 generally includes a chassis, a prime mover, wheels and/or tracts, and a cab for housing the operator. The vehicle 110 can be in the form of any desired agricultural vehicle, such as a tractor or self-propelled windrower.

4

Figure 5:
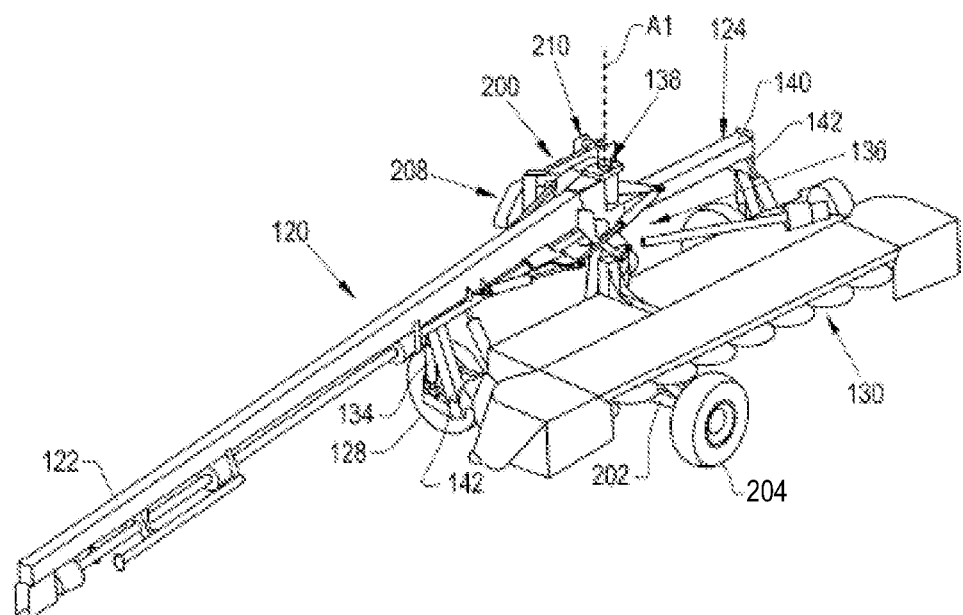
FIG. 5 is a side perspective view of the agricultural mowing device of FIGS. 1-4, with the agricultural mowing device in a transport position wherein the transport system is deployed for supporting the agricultural mowing device.

The mowing device 120 may be in the form of a center pivot mowing device or mowing device conditioner 120. As shown, the mowing device 120 is in the form of a center pivot mowing device conditioner 120. However, the mowing device 120 may be in the form of any desired mowing device. The mowing device 120 is configurable in a field position for cutting a crop material in the field (FIGS. 1-3) and a transport position for transporting the agricultural mowing device 120 (FIG. 5). The mowing device 120 may also be positioned between various field positions, such as an intermediate field position (FIG. 1), a full field left position (FIG. 2), and a full field right position (FIG. 3).

The mowing device 120 may generally include a towing tongue 122 connected to the agricultural vehicle 110, a trail frame 124 rotatably connected to the towing tongue 122 about an axis of rotation Al, trail frame wheels 126, 128, a cutter bar 130, a pair of conditioning rollers 132, a pair of lift actuators 134 operably connected in between the trail frame 124 and the trail frame wheels 126, 128, a trail frame actuating mechanism 136 for rotating the trail frame 124 and the cutter bar 130 therewith, and a lateral transport system 200 connected to the towing tongue 122 for selectively supporting the mowing device 120 in the transport position. The mowing device 120 may also include a controller 150, with a memory 152, for automatically controlling the trail frame actuating mechanism 136 and the transport system 200.

The towing tongue 122 removably connects to the agricultural vehicle 110. The towing tongue 122 has a first, proximal end and a second, distal end. The first end of the towing tongue 122 is connected to the agricultural vehicle 110. The second end of the towing tongue 122 rotatably mounts the trail frame 124 about the axis of rotation. The second end of the towing tongue 122 may rotatably mount the trail frame 124 via any desired mounting bracket 138. The towing tongue 122 may comprise any desired material, such as metal.

The trail frame 124 is rotatably connected to the towing tongue 122 via the mounting bracket 138 and the trail frame 124 accordingly rotates about the vertical axis of rotation Al. The trail frame 124 has a horizontal main beam 140 and a pair of vertical side beams 142 which downwardly extend from the main beam 140. The main beam 140 is rotatably connected to the towing tongue 122 about the axis of rotation Al. The main beam 140 is located underneath the transport system 200. The side beams 142 respectively rotatably mount the trail frame wheels 126, 128. The trail frame 124 supports the weight of the mowing device 120 in the field position but the trail frame 124 does not support the weight of the mowing device 120 in the transport position. Hence, the trail frame wheels 126, 128 support the trail frame 124 in the field position but do not support the trail frame 124, or any other component of the mowing device 120, in the transport position (FIG. 5). The trail frame 124 may comprise any desired shape and material.

The cutter bar 130 is connected to the trail frame 124. The cutter bar 130 cuts the crop material in the field position. The cutter bar 130 may be in the form of any desired cutter bar 130, such as a sickle bar or rotating disc cutter bar. The cutter bar 130 has a front end or edge and a back end or edge that is located behind the front end in the direction of crop material flow, i.e., opposite to the forward direction travel F. The front end of the cutter bar 130 defines a front longitudinal axis. It should be appreciated that the front edge of the cutter bar 130 may be defined by the front edge of the rock guards.

The conditioning rollers 132 are located downstream of the cutter bar 130. The conditioning rollers 132 condition the crop material as it exits the mowing device 120. The conditioning rollers 132 may be in the form of any desired rollers. As can be appreciated, the mowing device 120 may or may not include conditioning rollers 132.

The lift actuators 134 are respectively connected in between the trail frame 124 and the trail frame wheels 126, 128. More particularly, each lift actuator 134 is transversely connected in between the trail frame 124 and an extension bracket (unnumbered) of a respective trail frame wheel 126, 128. The lift actuators 134 pivot the trail frame wheels 126, 128 up or down to thereby raise or lower the trail frame 124, i.e., the rear of the mowing device 120. Thereby, the lift actuators 134 may create additional clearance or space for allowing the transport system 200 to move into a position for supporting the mowing device 120. The lift actuators 134 may be in the form of any desired hydraulic and/or electric cylinders. For example, the lift actuators 134 may be in the form of hydraulic lift cylinders 134 which are hydraulically connected to the hydraulic system of agricultural vehicle 110 via one or more fluid lines.

The trail frame actuating mechanism 136 is operably connected in between the towing tongue 122 and the trail frame 124. The trail frame actuating mechanism 136 rotates the trail frame 124 in between its field positions for field operation and into its lateral position for transport. As used herein, the field right and left positions of the trail frame 124 may refer to any desired field-operating orientation of the trail frame 124 in which the trail frame 124 is not perpendicular to the towing tongue 122.

The trail frame actuating mechanism 136 includes a rotational link 144, a first trail frame actuator 146 (a field swing actuator), and a second trail frame actuator 148 (a transport swing actuator; FIG. 2). The rotational link 144 is rotatably connected to the towing tongue 122 and extends outwardly from the towing tongue 122. The rotational link 144 may be in the form of a flat plate. The rotational link 144 operably connects the first and second trail frame actuators 146, 148 to the towing tongue 122 at a location which is distally located away from the towing tongue 122 so that the first and second trail frame actuators 146, 148 may act in conjunction to swing the trail frame 124 between its field right and left positions and also rotate the trail frame 124 into and out of its lateral position in the transport position. The rotational link 144 is capable of rotating forwardly or rearwardly relative to the towing tongue 122 upon retraction or extension of the first and/or second trail frame actuators 146, 148.

The first trail frame actuator 146 is connected to the trail frame 124, via a corresponding bracket (unnumbered), and the rotational link 144. The second trail frame actuator 148 is connected to the towing tongue 122 and the rotational link 144. The first and/or second trail frame actuator 146, 148 may be used to rotate the trail frame 124 throughout any desired position of the trail frame 124. By way of example only, the first trail frame actuator 146 may be in the form of a field swing actuator 146 for rotating the trail frame 124 in between its field intermediate, right, and left positions. The second trail frame actuator 148 may be in the form of a transport swing actuator 148 for rotating the trail frame 124 in between its lateral position for transport and its extended, e.g., substantially perpendicular, field position for field operation. The first and second trail frame actuators 146, 148 may be in the form of any desired hydraulic and/or electric cylinders. For example, the first and second trail frame actuators 146, 148 may be in the form of hydraulic cylinders 146, 148 which are hydraulically connected to the hydraulic system of agricultural vehicle 110 via one or more fluid lines. As can be appreciated, the first and second trail frame actuators 146, 148 may or may not be identical actuators.

Figure 2:
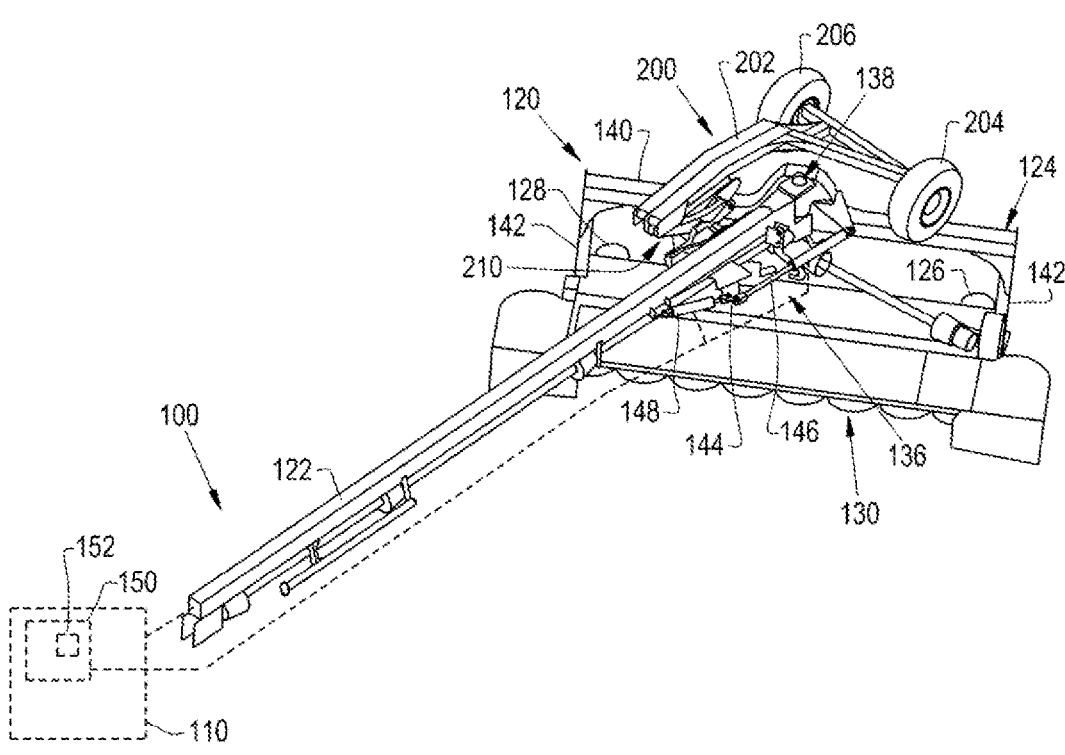
FIG. 2 is another perspective view of the agricultural mowing assembly of FIG. 1, and the agricultural mowing device is shown to be in a full field left position.
Figure 3:
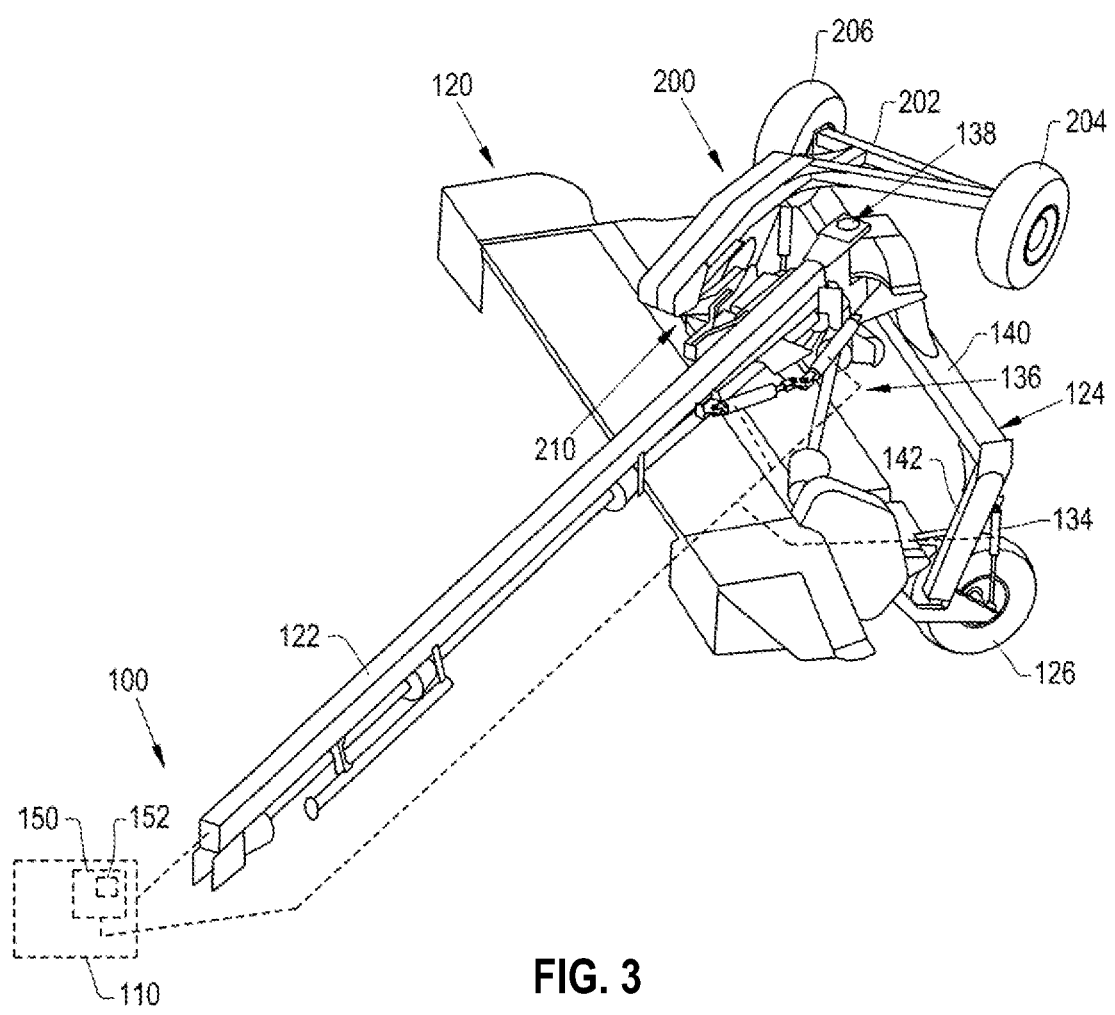
FIG. 3 is another perspective view of the agricultural mowing assembly of FIGS. 1-2, and the agricultural mowing device is shown in a full field right position.
Figure 4:
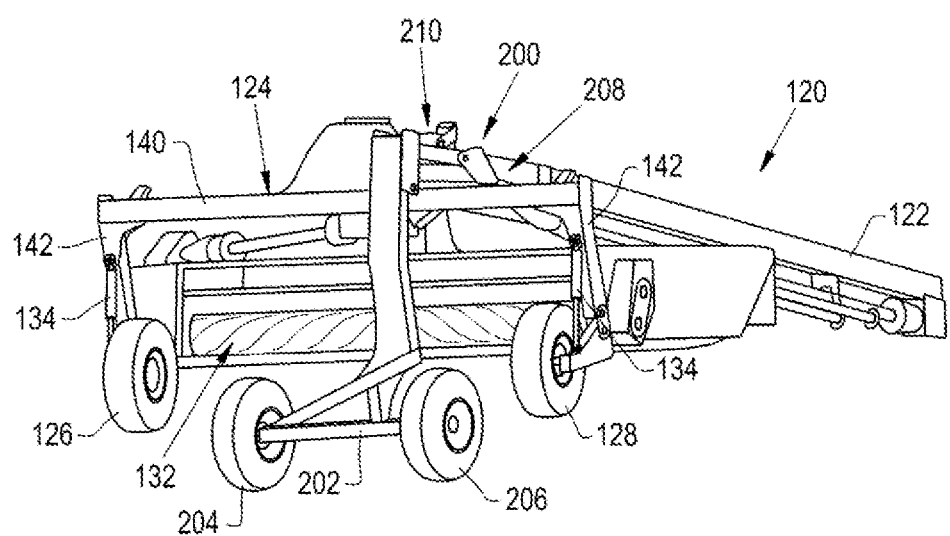
FIG. 4 is a rear perspective view of the agricultural mowing device of FIGS. 2-3, with the transport system deployed and before lateral rotation of the trail frame.

The transport system 200 supports the mowing device 120, e.g., the trail frame 124, the cutter bar 130, and/or the towing tongue 122, in the transport position (FIG. 5) but does not support the mowing device 120 in the field position (FIGS. 1-2). The transport system 200 includes a transport frame 202 rotatably connected to the towing tongue 122, transport wheels 204, 206 rotatably connected to the transport frame 202, and a transport actuating mechanism 208 for movably, i.e., rotatably, connecting the transport frame 202 to the towing tongue 122. Since the transport system 200 is connected to the side of the towing tongue 122, the transport system 200 does not move in conjunction with the trail frame 124. Also, the side or lateral location of the transport system 200 allows the weight of the mowing device 120 to be more evenly distributed between the transport wheels 204, 206.

The transport frame 202 is rotatable in between a retracted stowed position in the field position wherein the transport frame 202 is located above the trail frame 124 (FIGS. 1-3) and an extended support position in the transport position wherein the transport wheels 204, 206 support the trail frame 124 (FIG. 5) on a transport surface (e.g., the ground or a roadway). The transport frame 202 is rotatably connected to the towing tongue 122, via the transport actuating mechanism 208, at a location forward of the axis of rotation Al of the trail frame 124 in the direction of forward travel F. Hence, the transport frame 202 is at least partially located in front of the axis of rotation A1 of the trail frame 124 in the direction of forward travel F in the field position, and the transport frame 202 is located rearwardly of the axis of rotation A1 of the trail frame 124 in the direction of forward travel F in the transport position. The transport frame 202 rotates about a substantially horizontal axis of rotation, plus or minus 30 degrees. Also, the connection point of the transport frame 202 is located vertically above the main beam 140 of the trail frame 124. Thus, the main beam 140 is located underneath the transport frame 202 in the field position such that the main beam 140 passes underneath the transport wheels 204, 206 when the transport frame 202 is in the retracted stowed position in the field position.

The transport frame 202 may include one or more beams which define a bent, elongated member and an axle for mounting the transport wheels 204, 206. Hence, the transport wheels 204, 206 are jointly mounted on a common axle. The transport frame 202 may comprise any desired shape and material.

The first and second transport wheels 204, 206 support the weight of the mowing device 120, e.g., the weight of the trail frame 124, the cutter bar 130, and/or the towing tongue 122, upon being fully deployed in the transport position of the mowing device 120. The first transport wheel 204 may be considered a front or left transport wheel 204, and the second transport wheel 206 may be considered a back or right transport wheel 206. The transport wheels 204, 206 may be identical and thus have the same material, size, and weight capacity. The transport wheels 204, 206 may comprise any desired wheels. The first transport wheel 204 is radially located closer to the axis of rotation A1 of the trail frame 124 than the front end of the cutter bar 130 in the transport position. Hence, both transport wheels 204, 206 are located behind the front longitudinal axis of the front end of the cutter bar 130, which in turn more evenly distributes the weight of the mowing device 120 between the front and rear transport wheels 204, 206.

The transport actuating mechanism 208 includes a linkage assembly 210, with multiple links (unnumbered), and a transport actuator 220 operably connected in between the towing tongue 122 and the transport frame 202, via the linkage assembly 210. The transport actuating mechanism 208 may also include one or more brackets 222, 224 for mounting the linkage assembly 210 and the transport actuator 220 to the side of the towing tongue 122. For instance, one bracket 222 may be in the form of an elongated bracket that extends outwardly and perpendicularly from the side of the towing tongue 122, and another bracket 224 may be in the form of a shorter actuator bracket 224 that is connected to the side of the towing tongue 122 in front of the location point of the elongated bracket 222. The linkage assembly 210 is rotatably connected in between the transport frame 202 and the towing tongue 122.

The linkage assembly 210 may include a first link connected in between the elongated bracket 222 and the transport frame 202, a second, upper link connected in between the elongated bracket 222 and the transport frame 202, a third link connected to the second link, and a fourth link connected to the elongated bracket 222, the third link, and the transport actuator 220. It should be appreciated that the linkage assembly 210 may include any desired number of links, such as two, three, four, five, or more links. The transport actuator 220 may be connected in between the linkage assembly 210, i.e., fourth link, and the towing tongue 122 via the actuator bracket 224. The transport actuator 220 may be in the form of any desired hydraulic and/or electrical cylinder. For instance, the transport actuator 220 may be in the form of a hydraulic cylinder 220 that is hydraulically connected to the hydraulic system of agricultural vehicle 110 via one or more fluid lines. The transport actuator 220 may be the only actuator for moving the transport frame 202.

The controller 150 is operably connected to the lift, trail frame, and transport actuators 134, 146, 148, 220. The controller 150 may also be operably connected to a user interface within the cab of the agricultural vehicle 110. The controller 150 may automatically position the mowing device 120 in its transport position or field position upon the user inputting a corresponding command into the user interface. The controller 150 may be a standalone controller or integrated into the existing hardware and/or software of the agricultural vehicle 110 and/or mowing device 120.

Figure 6:
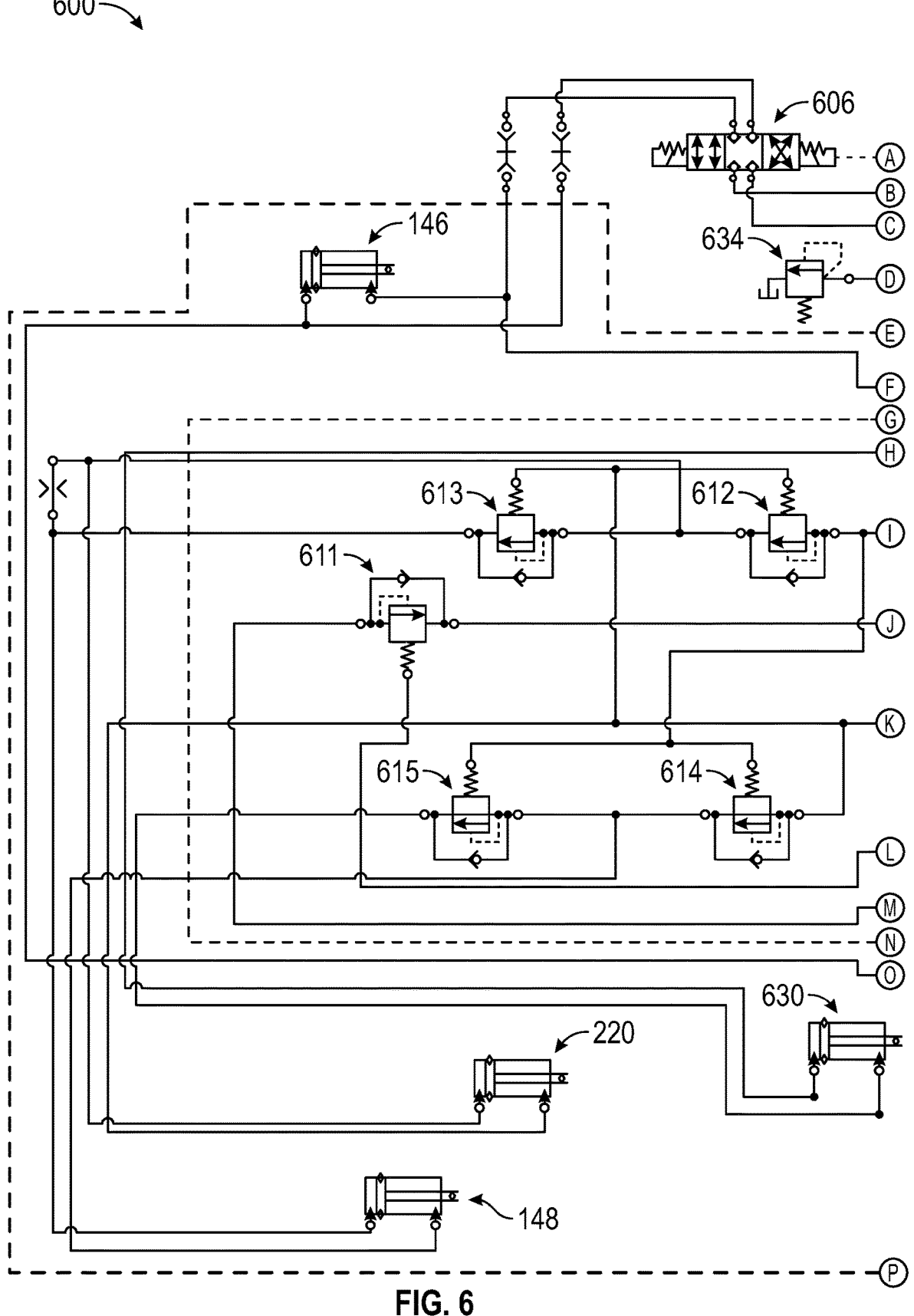
FIG. 6 illustrates a schematic of an example hydraulic system of the agricultural mowing device of FIGS. 1-5.
Figure 6:
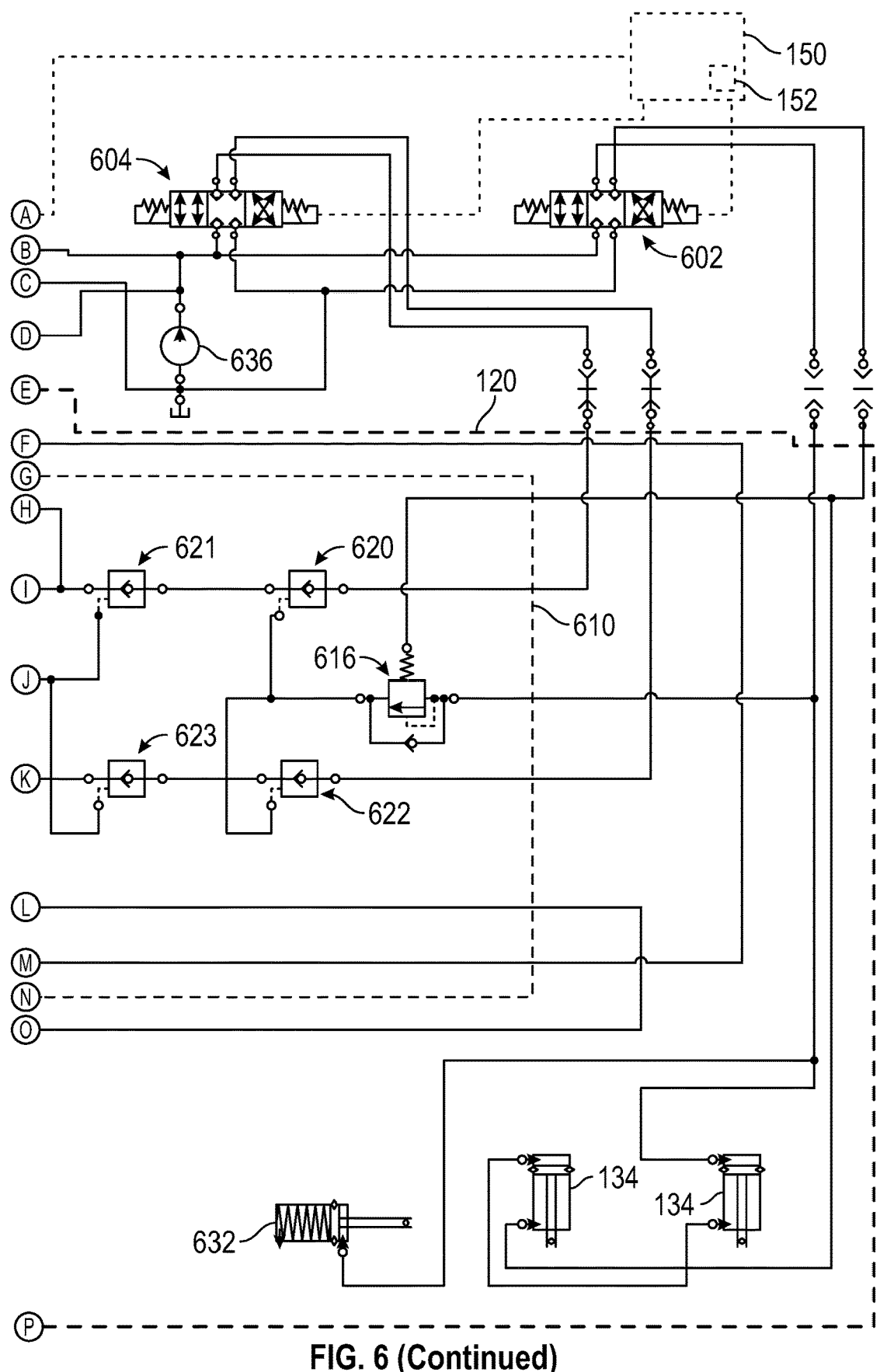

There is shown, in FIG. 6, an exemplary position and pressure-based hydraulic system 600 for the transport system 200. The hydraulic system 600 may generally include the lift actuators 134, the field swing actuator 146, the transport swing actuator 148, the transport actuator 220, and directional control valves 602, 604, 606, respectively, fluidly connected to the lift actuators 134, field and transport swing actuators 146, 148, and the transport actuator 220. The directional control valves 602, 604, 606 may include a lift valve 602 fluidly connected to the lift actuators 134, a transport valve 604 fluidly connected to the transport swing actuator 148 and the transport actuator 220, and a swing valve 606 fluidly connected to the field swing actuator 146.

The lift, transport, and swing valves 602, 604, 606 may be operably connected to the controller 150. Thereby, the controller 150 may selectively activate the lift, transport, and swing valves 602, 604, 606 to position the mowing device 120 in between its field and transport positions. Accordingly, the hydraulic system 600 may include a lift function, a swing function, a transport deployment function, and a transport stowage function for controlling the operation of the lift actuators 134, the field swing actuator 146, the transport swing actuator 148, and the transport actuator 220.

The hydraulic system 600 may also include a hydraulic manifold 610 with multiple hydraulic fluid lines, sequence valves 611, 612, 613, 614, 615, 616, and pilot operated check valves 620, 621, 622, 623. The hydraulic manifold 610 is fluidly connected in between the actuators 134, 146, 148, 220 and their corresponding valves 602, 604, 606. The hydraulic system 600 may or may not include a windrow shield actuator 630, for folding the windrow shields in the transport position, and a tilt actuator 632 for tilting the mowing device 120. Furthermore, the hydraulic system 600 may include a relief valve 634, hydraulic pump 636, and multiple shuttle valves (unnumbered). The hydraulic system 600 may be incorporated as part of the agricultural vehicle 110 and/or the mowing device 120. For instance, the directional valves 602, 604, 606, hydraulic pump 636, and relief valve 634 may be positioned on the agricultural vehicle 110 and the hydraulic manifold 610 and actuators 134, 146, 148, 220 may be located on the mowing device 120. It should be appreciated that the hydraulic manifold 610 may be automatically and/or manually controlled. For instance, the hydraulic system 600 may include one or more hand-controlled inputs, e.g., levers, switches, etc., which the operator can manually operate to activate any desired component of the hydraulic system 600, such as the directional valves 602, 604, 606. In other instances, the hydraulic system 600 may include one or more electronic inputs, e.g., switches, logic gates, etc., which a computer system can actuate to activate one or more components of the hydraulic system 600, such as the directional valves 602, 604, 606.

The hydraulic system 600 has a built-in lockout feature wherein the transport hydraulics, e.g., the transport swing actuator 148 and the transport actuator 220, and fluid lines thereof, are prevented from operating unless the field swing cylinder 146 is fully retracted in the full field right position of the mowing device 120 and the lift actuators 134 are fully extended in the fully elevated position of the mowing device 120. The check valves 620, 621, 622, 623 render the transport swing actuator 148 and the transport actuator 220 non-functional at any time when the lift actuators 134 are not fully extended and the field swing actuator 146 is not fully retracted. Thus, this lockout feature prevents the use of the transport system 200 during field operation, such as when mowing, or during roadway transport.

Furthermore, the hydraulic system 600 also ensures that the trail frame 124 cannot rotate in the wrong direction during the final stage of deploying the transport system 200, which may cause damage to the trail frame 124 and/or transport system 200. For instance, the lockout feature ensures that the trail frame 124 is located in its full field right position, as opposed to the field left or intermediate position, such that when the transport frame 202 is rotated downwardly it does not contact the trail frame 124, and once the transport frame 202 is fully deployed, the trail frame 124 is prevented from rotating in the wrong direction, which would cause the trail frame 124 to contact the transport frame 202.

To start the lift function of the hydraulic system 600 in order to raise the mowing device 120, the controller 150 will shift the lift valve 602 so that the lift actuators 134 start raising the trail frame 124. The extension of the actuators 134 will then trip the sequence valve 616 and open the check valves 620, 622. It is noted that if the mowing device 120 includes a tilt actuator 632, then the tilt cylinder will also retract upon raising the mowing device 120. To start the swing function of the hydraulic system 600 in order to position the mowing device 120 in its field positions, the controller 150 will shift the swing valve 606 to retract and/or extend the field swing actuator 146. This will then trip the sequence valve 611 and open the check valves 621, 623.

To start the transport deployment function of the hydraulic system 600, the controller 150 will fully extend the lift actuators 134, lock the lift valve 602, fully retract the field swing actuator 146, and lock the swing valve 606. The controller 150 then shifts and locks the valve 604 to begin transport deployment.

If equipped with windrow shield(s), transport deployment may begin with retraction of the windrow shield(s). The windrow shield(s) may be retracted in response to shifting of the valve 604, which allows hydraulic fluid flow to the windrow shield actuator 630 to retract the windrow shield (s). If the mowing device 120 is not equipped with a windrow shield, this aspect may be omitted.

The trail frame 124 and the transport frame 202 are then put into motion. In an example embodiment, the sequence valve 612 is tripped to concurrently extend the transport swing actuator 148 and the transport actuator 220 by providing hydraulic fluid flow thereto. Upon full extension of the transport swing actuator 148, the sequence valve 613 is tripped to channel full hydraulic fluid flow to the transport actuator 220 in order to speed up deployment of the transport frame 202.

After the transport frame 202 is deployed, the controller 150 will shift the transport valve 604 to the blocked position and will shift the swing valve 606 to fully extend the field swing actuator 146 in order to place the trail frame 124 in its full lateral transport position, wherein the trail frame 124 is substantially parallel to the towing tongue 122. The controller 150 will then shift the lift valve 602 to its lower position, and thereby the lift actuators 134 will retract and lift the field wheels 126, 128 upwardly to increase ground clearance.

During steady-state, i.e., constant, transport or road operation of the mowing device 120, the check valves 620, 621, 622, 623 will be closed, which disables transport hydraulic function during transport of the mowing device 120.

To start the transport stowage function of the hydraulic system 600, in a first stage transitioning from the deployed position to the stowed position of the transport system 200, the controller 150 will shift the lift valve 602 to extend the lift actuators 134, tripping the sequence valve 616 and opening the check valves 620, 622. The controller 150 will also shift the swing valve 606 to retract and pressurize the field swing actuator 146, tripping sequence valve 611 and opening the check valves 621, 623. Thereafter, the controller 150 will shift the transport valve 604 to provide hydraulic fluid flow through the check valves 622, 623. Then, the transport actuator 220 will retract. The transport valve 604 will remain locked in this position through stowage of the transport system 200.

During a second stage of the transport stowage function, the lift valve 602 and the swing valve 606 will remain locked, to keep the check valves 620, 622, 621, 623 open, and the transport valve 604 will remain locked. Once the transport actuator 220 has fully retracted, the sequence valve 614 will trip, which allows hydraulic fluid flow to retract the transport swing actuator 148.

During a third stage of the transport stowage function, the lift valve 602 and the swing valve 606 will remain locked, to keep the check valves 620, 622, 621, 623 open, and the transport valve 604 will remain locked. After the transport swing actuator 148 has fully retracted, the sequence valve 615 will trip, which allows hydraulic fluid flow through to retract the windrow shield actuator 630, if equipped.

During a fourth stage of the transport stowage function, the transport swing cylinder 148 has been completely retracted and the transport valve 604 shifts into its closed position by the controller 150. The controller 150 will also shift the lift valve 602 and the swing valve 606 to their respective closed position, thereby closing the check valves 620, 621, 622, 623 and locking out the transport hydraulics from operation. At the end of the fourth stage, the mowing device 120 may be in its full field right position.

FIG. 7 depicts a flowchart of an exemplary method 700 for operating an agricultural mowing assembly 100. The method 700 initially includes the step of providing the mowing device 120 with integrated transport system 200 (block 702). For ease of description, the method is described below with a control system (including the controller 150, sequence valves 611, 612, 613, 614, 615, 616, and pilot operated check valves 620, 621, 622, 623) performing the steps. As described herein, one or more of the steps may be performed manually.

At block 704, the controller system prepares the mowing device 120 to deploy the transport system 200. In an example implementation, the mowing device 120 has a lockout state that prevents the transport system from deploying until predefined conditions are met. These predefined conditions include rotating the trail frame 124 to a designated field position (e.g., full field right) and raising the trail frame 124 to a predefined height (e.g., its maximum height). In accordance with this example implementation, the control system prepares the mowing device 120 to deploy the lateral transport mechanism by rotating the trail frame 124 to the designated field position (block 704 (*i*); e.g., by fully retracting the field swing actuator 146) and raising the trail frame 124 (block 704 (*ii*); e.g., by fully extending the lift actuators 134).

At block 706, once the lockout conditions are met, the control system unlocks the transport hydraulics of the transport system 200 to allow deployment thereof. The windrow shield actuator 660 is initially actuated to retract/flow the windrow shield(s), if equipped. The transport hydraulics for both the transport swing actuator 148 and the transport actuator 220 are then concurrently activated to begin rotation of the trail frame 124 and deployment of the transport frame 202. Concurrent actuation is possible due to the relatively low pressure requirement for the initial actuation of the transport actuator 220, where the transport wheels are being moved from a first stored position to a second position in which the transport wheels contact the ground, and the relatively low pressure requirement to actuate the transport swing cylinder 148 to rotate the trail frame 124. The low pressure requirements allow higher flow into both cylinders at the same time, reducing cycle times compared to previous systems that fully extended the transport cylinder 220 prior to actuating the transport swing cylinder 148.

At block 708, the control system initiates movement of the transport frame 202 and rotation of the trail frame 124. The control system continues to move the transport frame 202 until it is partially deployed. In an example implementation, the control system continues moving the transport frame 202 until the transport wheels 204, 206 coupled to the transport frame 202 engage a transport surface (e.g., the ground or a roadway).

At block 710, the control system halts movement of the transport frame 202 (e.g., upon engagement of the transport surface) and continues to rotate the trail frame 124 until the transport swing actuator 148 reaches a predefined position (e.g., the trail frame 124 is substantially perpendicular to the towing tongue 122, plus or minus 30 degrees). In an example implementation, the trail frame 124 is substantially perpendicular to the towing tongue 122, plus or minus 30 degrees when the transport swing actuator 148 is fully extended, even though the field swing cylinder 146 remains fully retracted. Upon halting movement of the transport frame 202, energy used to move the transport frame is available to rotate the trail frame 124.

At block 712, the control system resumes movement of the transport frame 202 and halts rotation of trail frame 124 (e.g., upon reaching the predefined position). In an example implementation, the control system continues to move the transport frame 202 until it is fully deployed in an extended transport support position. Upon halting rotation of the trail frame 124, energy used to rotate the trail frame is available to move the transport frame 202.

At block 714, the control system resumes rotation of the trail frame 124 after the transport frame 202 halts (e.g., upon reaching the extended transport support position). In an example implementation, the control system continues to rotate the trail frame 124 until it is substantially aligned with the towing tongue 122, for example substantially parallel to the towing tongue 122, plus or minus 30 degrees, in order to reduce the overall width of the mowing device 120 for transport on a roadway. The control system may extend the field swing actuator 146 to complete the rotation of the trail frame 124 into a lateral position for transport.

At block 716, the control system raises the field wheels 126, 128. In an example implementation, the control system fully retracts the lift actuators 134 to raise the field wheels 126, 128 in order to provide additional clearance during transportation of the mowing device.

At block 718, the control system initiates storage of the lateral transport mechanism, e.g., to return the mowing device 120 to a field position after transport. In an example implementation, the control system initiates storage by retracting the field swing actuator 146 to rotate the trail frame 124 from the lateral transport position to the predefined position (e.g., perpendicular to the towing tongue 122). This increases the overall width of the mowing device 120.

At block 720, the control system moves the transport frame 202 from its extended support position to its retracted stowed position. In an example implementation, the control system fully retracts the transport actuator 220 to move the transport frame 202 into its retracted stowed position.

At block 722, the control system positions the trail frame 124 in a designated field position (e.g., full field right). In an example implementation, the control system fully retracts that the transport swing cylinder 148 to position the trail frame 124 in the designated field position and complete the lateral transport storage process and place the mowing device in its filed position.

It should be appreciated that the operator may stay within the cab of the agricultural vehicle 110 while the method 700 is conducted by the controller 150. It should also be appreciated that the method 700 may be conducted manually by the operator, wherein the operator activates the directional valves 602, 604, 606 by hand.

It is to be understood that the steps of the method 700 may be performed by the controller 150 upon loading and executing software code or instructions which are tangibly stored on a non-transitory computer readable medium, such as on a magnetic medium, e.g., a computer hard drive, an optical medium, e.g., an optical disc, solid-state memory, e.g., flash memory, or other storage media known in the art. Thus, any of the functionality performed by the controller 150 described herein, such as the method 700, is implemented in software code or instructions which are tangibly stored on a tangible computer readable medium. The controller 150 loads the software code or instructions via a direct interface with the computer readable medium or via a wired and/or wireless network. Upon loading and executing such software code or instructions by the controller 150, the controller 150 may perform any of the functionality of the controller 150 described herein, including any steps of the method 700 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein but is intended to include all changes and modifications that are within the scope and spirit of the invention.

What is claimed is:

1. A method for actuating a lateral transport mechanism of a mowing device comprising a towing tongue, a trail frame rotatably coupled to the towing tongue, at least one windrow shield, and at least one windrow shield actuator coupled between the trail frame and the at least one windrow shield, the lateral transport mechanism comprising a transport frame supporting transport wheels, a transport actuator coupled between the towing tongue and the transport frame, and a transport swing actuator coupled between the trail frame and the towing tongue, the method comprising:

initiating deployment of the lateral transport mechanism by concurrently activating both the transport actuator to move the transport frame supporting the transport wheels and the transport swing actuator to rotate the trail frame;

stowing the at least one windrow shield adjacent to the trail frame using the at least one windrow shield actuator prior to concurrently activating both the transport actuator and the transport swing actuator;

moving the transport frame from a stowed position and rotating the trail frame upon activation of both the transport actuator and the transport swing actuator until the transport wheels engage a transport surface;

continuing to rotate the trail frame and halting movement of the transport frame after engagement of the transport wheels with the transport surface until the trail frame reaches a predefined position;

resuming movement of the transport frame and halting rotation of the trail frame after the trail frame reaches the predefined position until the transport frame reaches a transport support position; and resuming rotation of the trail frame after the transport frame reaches the transport support position until the trail frame reaches a lateral transport position.

2. The method of claim 1, wherein the mowing device further comprises a field swing actuator coupled between the towing tongue and the trail frame and wherein the initiating deployment of the lateral transport mechanism is conditioned on:

rotating the trail frame to position the trail frame in a designated field position with respect to the towing tongue using the field swing actuator.

3. The method of claim 2, wherein the designated field position is at least one of full field left or full field right.

4. The method of claim 2, wherein the mowing device further comprises field wheels coupled to the trail frame and at least one lift actuator coupled between the trail frame and the field wheels to move the trail frame relative to the field wheels and wherein the initiating deployment of the lateral transport mechanism is further conditioned on:

raising the trail frame to a predefined raised position with respect to the field wheels.

5. The method of claim 4, further comprising:

raising the field wheels with respect to the trail frame after the trail frame reaches the lateral transport position.

6. The method of claim 2, wherein the resuming rotation of the trail frame after the transport frame reaches the transport support position comprises activating the field swing actuator.

7. The method of claim 2, further comprising:

initiating storage of the lateral transport mechanism by activating the transport swing actuator to rotate the trail frame from the lateral transport position to the predefined position;

activating the transport actuator to retract the transport frame from the transport support position to the stowed position; and rotating the trail frame to position the trail frame in the designated field position with respect to the towing tongue using the transport swing actuator.

8. The method of claim 1, wherein the trail frame has a longitudinal axis and wherein the predefined position of the trail frame is reached when the longitudinal axis of the trail frame is perpendicular to the towing tongue.

9. The method of claim 1, wherein the halting rotation of the trail frame after the trail frame reaches the predefined position comprises the transport swing actuator reaching a maximum extension.

10. The method of claim 9, wherein the transport actuator and the transport swing actuator are hydraulic cylinders and wherein hydraulic pressure applied to the transport swing actuator prior to reaching the maximum extension is available for the transport actuator after reaching the maximum extension.

11. The method of claim 1, wherein the transport actuator and the transport swing actuator are hydraulic actuators and wherein hydraulic pressure applied to the transport actuator prior to the wheels engaging the transport surface is available for the transport swing actuator after the wheels engage the transport surface.

12. A mowing device comprising:

a towing tongue;

a trail frame rotatably coupled to the towing tongue;

a field swing actuator coupled between the towing tongue and the trail frame; and a lateral transport mechanism comprising a transport frame supporting transport wheels, a transport actuator coupled between the towing tongue and the transport frame, and a transport swing actuator coupled between the trail frame and the towing tongue, the lateral transport mechanism configured to:

initiate deployment of the lateral transport mechanism by concurrently activating both the transport actuator to move the transport frame supporting the transport wheels and the transport swing actuator to rotate the trail frame, wherein the initiating deployment of the lateral transport mechanism is conditioned on detecting the mowing device rotating the trail frame to a designated field position with respect to the towing tongue using the field swing actuator;

move the transport frame from a stowed position and rotate the trail frame upon activation of both the transport actuator and the transport swing actuator until the transport wheels engage a transport surface;

continue to rotate the trail frame and halt movement of the transport frame after engagement of the transport wheels with the transport surface until the trail frame reaches a predefined position;

resume movement of the transport frame and halt rotation of the trail frame after the trail frame reaches the predefined position until the transport frame reaches a transport support position; and resume rotation of the trail frame after the transport frame reaches the transport support position until the trail frame reaches a lateral transport position.

13. The mowing device of claim 12, wherein the transport actuator has a longitudinal transport actuator axis, the transport swing actuator has a longitudinal transport swing actuator axis, and the longitudinal transport actuator axis is perpendicular to the longitudinal transport swing actuator axis.

14. The mowing device of claim 12, wherein the lateral transport mechanism further comprises a processor and instructions stored in a memory and wherein the instructions, when executed by the processor, configure to the mowing device to initiate the deployment of the lateral transport mechanism.

15. The mowing device of claim 12, wherein the trail frame has a longitudinal axis and wherein the predefined position of the trail frame is reached when the longitudinal axis of the trail frame is perpendicular to the towing tongue.

16. The mowing device of claim 12, wherein the transport actuator and the transport swing actuator are hydraulic cylinders.

17. A mowing device assembly, comprising:

an agricultural vehicle; and the mowing device of claim 12 coupled to the agricultural vehicle.

18. The mowing device assembly of claim 17, further comprising:

a processor;

a memory; and instructions stored in the memory, the instructions, when executed by the processor, configure the mowing device assembly to initiate the deployment of the lateral transport mechanism.

* * * * *